United States Patent [19]

Gabano

[11] 4,375,502
[45] Mar. 1, 1983

[54] ELECTROLYTE FOR A LITHIUM/THIONYL CHLORIDE ELECTRIC CELL, A METHOD OF PREPARING SAID ELECTROLYTE AND AN ELECTRIC CELL WHICH INCLUDES SAID ELECTROLYTE

[75] Inventor: Jean-Paul Gabano, Poitiers, France

[73] Assignee: Societe Anonyme dite: GIPELEC, Levallois-Perret, France

[21] Appl. No.: 259,186

[22] Filed: Apr. 30, 1981

[30] Foreign Application Priority Data

May 7, 1980 [FR] France .................. 80 10170

[51] Int. Cl.³ .............................. H01M 6/14
[52] U.S. Cl. ...................... 429/101; 429/196; 429/197; 429/199
[58] Field of Search ............... 429/101, 105, 194, 196, 429/197, 198, 199

[56] References Cited

U.S. PATENT DOCUMENTS 3,993,501  11/1976  Kalnoki-Kis ................. 429/48
4,093,784   6/1978  Driscoll ....................... 429/196 X
4,150,198   4/1979  Domeniconi et al. ......... 429/116

FOREIGN PATENT DOCUMENTS 2166015 of 0000 France.

OTHER PUBLICATIONS

A. N. Dey, "Primary Li/SoCl₂ Cells V. the Effect of Electrolyte Variables on the Morphology and the Growth Rate of the Lithium Film," Extended Abstracts of the Electrochemical Society, v. 77., No. 2, Oct. 1977, Abstract No. 15, pp. 46–47.

Primary Examiner—Anthony Skapars
Attorney, Agent, or Firm—Kenyon & Kenyon

[57] ABSTRACT

An electrolyte for an electric cell whose negative active material (4) is constituted by lithium and whose positive active material is constituted by thionyl chloride. The electrolyte contains at least one solvent and at least one solute, said solvent being thionyl chloride and said solute being chosen from the group which includes lithium tetrachloroaluminate and lithium hexachloroantimonate. According to the invention said electrolyte further includes a complex chosen from the group which includes $AlCl_3,SO_2$ and $SbCl_5,SO_2$.

The voltage rise of electric cells which include such an electrolyte takes negligible time. Figure to be published: FIG. 1.

8 Claims, 2 Drawing Figures

ELECTROLYTE FOR A LITHIUM/THIONYL CHLORIDE ELECTRIC CELL, A METHOD OF PREPARING SAID ELECTROLYTE AND AN ELECTRIC CELL WHICH INCLUDES SAID ELECTROLYTE

The present invention relates to electric cells whose negative active material is lithium and whose positive active material is thionyl chloride which also constitutes the solvent of the electrolyte which may possibly include other co-solvents. The invention also relates to a method of preparing an electrolyte for such electric cells.

BACKGROUND OF THE INVENTION

Such electric cells which are known, in particular through published French Pat. No. 2,166,015 (72 46158), have a very high energy density and their discharge voltage is about 3 volts. This makes it very desirable to use them. However, their disadvantage is that they reach their discharge voltage plateau only after a period of time due to the necessity of destroying the protective layer which passivates lithium in contact with thionyl chloride.

Efforts have been made to reduce this disadvantage. Thus published French Pat. No. 2,305,863 (76 08397) (U.S. Pat. No. 3,993,501) describes the lithium surface being covered with a layer of vinyl polymers which prevent passivating layers from forming. Also, in a paper read on the occasion of the 27th Power Sources symposium held in Atlantic City, it was recommended to add sulphur dioxide $SO_2$ at a concentration of 5% to a solution of tetrachloroaluminate in thionyl chloride so as to reduce the delay effect in voltage rise of primary cells which use this solution as electrolyte solvent and positive active material.

However, none of these means has proved completely effective.

Preferred embodiments of the present invention improve the performance of lithium/thionyl chloride electric cells by reducing the time it takes for the voltage to rise, reducing said time until it becomes practically negligible.

SUMMARY OF THE INVENTION

The present invention provides an electrolyte for an electric cell whose negative active material is constituted by lithium and whose positive active material is constituted by thionyl chloride, the electrolyte containing at least one solvent and at least one solute, said solvent being thionyl chloride and said solute being chosen from the group which includes lithium tetrachloroaluminate and lithium hexachloroantimonate, wherein said electrolyte further includes a complex chosen from the group which includes $AlCl_3,SO_2$ and $SbCl_5,SO_2$.

In this way, the electrolyte includes aluminum chloride or antimony pentachloride combined with the lithium chloride and a complex of sulphur dioxide with aluminum chloride or antimony pentachloride, but it includes neither an excess of lithium chloride (which, besides, is not soluble) nor an excess of sulphur dioxide.

Advantageous proportions of the ingredients are as follows: for 3 moles of aluminum chloride or of antimony pentachloride, 2 moles of lithium chloride and 1 mole of sulphur dioxide.

In primary cells which contain the electrolyte thus obtained, the delay in the voltage rise is null or negligible even after long periods of storage or rest.

It is possible to add a second solvent such as phosphoryl chloride or sulfuryl chloride to the thionyl chloride, in particular with a view to providing a second plateau at the end of discharge.

The invention also provides a method of preparing the above-described electrolyte.

Several methods can be put into practice, all of which provide the electrolyte in accordance with the invention.

According to a first method, firstly a Lewis acid chosen from the group which includes aluminum chloride and antimony pentachloride, secondly lithium chloride and lastly sulphur dioxide are added to the thionyl chloride in quantities which correspond to the contents required in the electrolyte, the molar proportions being such that there is an excess of said Lewis acid relative to the lithium chloride by a molar quantity equal to that of the sulphur dioxide.

Of course, the order of insertion of the various reagents could be different from that given hereinabove.

According to a second method, lithium carbonate and a Lewis acid chosen from the group which includes aluminum chloride and antimony pentachloride are added to the thionyl chloride in proportions such that there are 3 moles of said Lewis acid per mole of lithium carbonate, the quantity of said Lewis acid corresponding to the contents required in the electrolyte.

According to a third method, lithium and a Lewis acid chosen in the group which includes aluminum chloride and antimony pentachloride are added to the thionyl chloride in equimolar proportions, the quantity of said Lewis acid corresponding to the contents required in the electrolyte.

Of course, the invention also provides electric cells which contain electrolytes such as described hereinabove and/or manufactured in accordance with the above-mentioned methods.

BRIEF DESCRIPTION OF THE DRAWINGS

The invention will be better understood from the examples given hereinafter and from the accompanying drawings in which.

Figure 1:
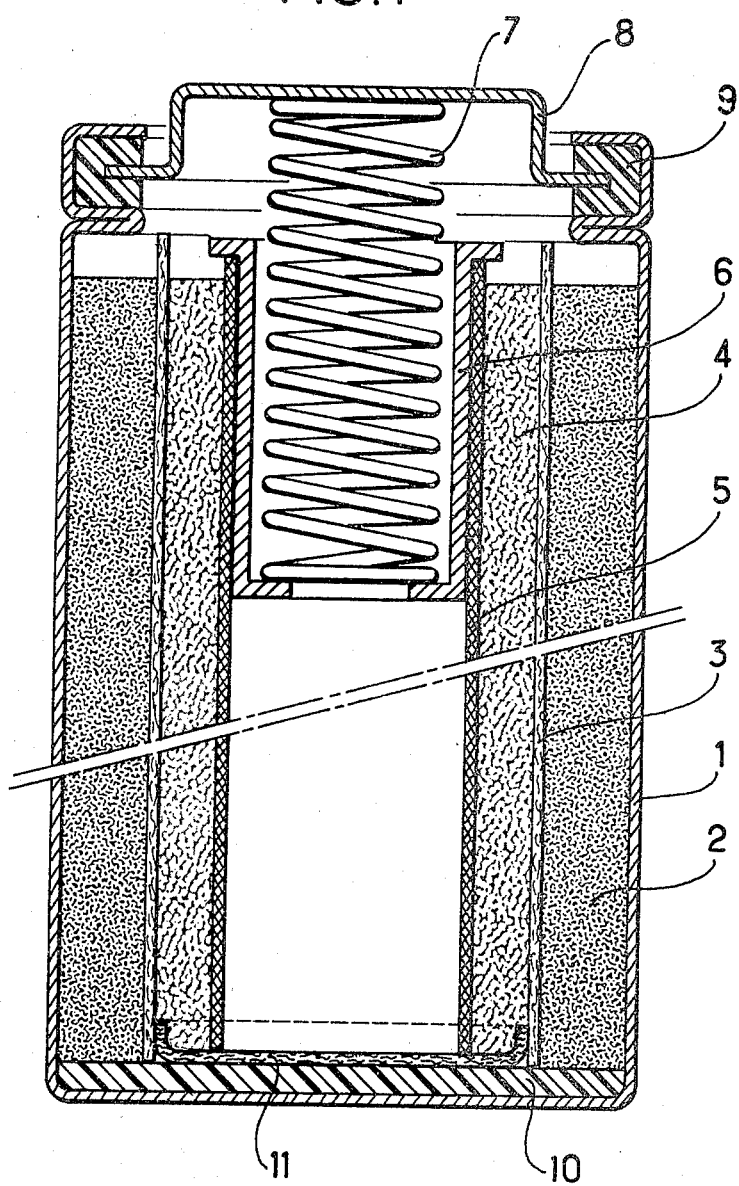
FIG. 1 illustrates one embodiment of an electric cell in accordance with the invention.

The following examples relate to the preparation of the electrolyte in accordance with the invention.

EXAMPLE I

The following compounds are successively added to one another to form a solution in thionyl chloride, the quantities being given for 1 liter of solution:
200 g (1.5 M) of aluminum chloride
42.4 g (1 M) of lithium chloride
32 g (0.5 M) of sulphur dioxide This provides 1 liter of solution containing 1 M of lithium tetrachloroaluminate $AlCl_4Li$ and 0.5 M of the complex $AlCl_3,SO_2$.

EXAMPLE II 200 g (1.5 M) of aluminum chloride and
37 g (0.5 M) of lithium carbonate are mixed successively with the quantity of thionyl chloride which gives 1 liter of solution. The compounds are shaken for about ten hours.

The following reaction takes place:

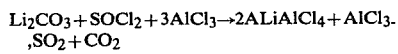

The carbon dioxide is emitted and the remaining solution is similar to that in example I.

EXAMPLE III 200 g (1.5 M) of aluminum chloride are dissolved in thionyl chloride and 8.3 g (1.2 M) of lithium are added thereto. The reagents are left to stand together for about fifteen hours, after which the lithium disappears and the amount of solution is made up to 1 liter by adding thionyl chloride. The following reaction takes place:

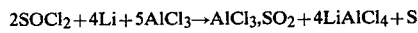

It will be observed that the proportions hereinabove are not the proportions obtained in examples I and II. Further, contrary to what happens in example II with the carbon dioxide, the sulphur remains in the solution. This may be a disadvantage at the end of discharge of the cells. However, the method produces an electrolyte which has been tested together with the others, and gives results analogous to those of the other two examples.

These solutions are included in primary cells such as the cell illustrated in FIG. 1.

These cells are cylindrical and have the following dimensions:

Height: 3.73 cm; diameter: 1.15 cm.

A stainless steel cup 1 contains the mass of the cathode collector 2 which is based on carbon. It can be obtained by a mixture of acetylene black and 15% polytetrafluoroethylene in the dry state. This dried mixture is sintered in the form of a ring against the walls of the cup 1 and has a porosity of about 82%.

A fibre glass separator 3 is interposed between the collector 2 and a lithium negative electrode 4 which consists of two half cylinders with their plane of separation passing through the axis of the cylinder. A metal cylindrical braiding 5 is disposed inside the half cylinders, and via a distance piece 6, a spring 7 exerts a force on this braiding which tends to shorten and to widen the braiding. In this way, the negative half cylinders 4 are constantly pushed towards the separator 3 as described in French Pat. No. 77 11565 of Apr. 18, 1977 (U.S. Pat. No. 4,127,704).

The braiding 5 acts as a negative collector and the current is transmitted via the metal distance piece 6 and the spring 7 to a metal cover 8 of the primary cell which cover is separated from the cup 1 by an insulating seal 9.

The bottom of the cup is insulated in a manner known per se by a bottom disk 10 and a centering cup 11.

The internal apparent area of the collector 2 is 8.57 cm$^2$. About 3.5 cm$^3$ of the thionyl chloride solution is placed in the primary cell and serves simultaneously as an electrolyte and as a positive active material.

Figure 2:
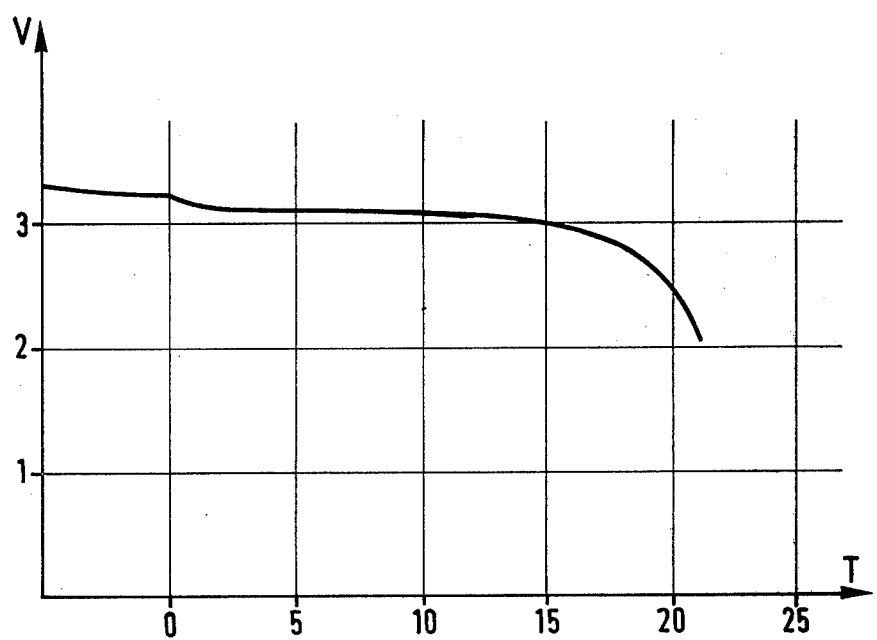
FIG. 2 shows the discharge curve of an electric cell in accordance with the invention.

FIG. 2 shows an average discharge curve for these cells. The voltage (V) of the cells in volts is plotted along the Y-axis and the duration (T) of the discharge is plotted along the X-axis. The first minute of discharge is plotted before the O of the curve at an enlarged scale to show, if need be, a delay in the rise in voltage. The rest of the duration is counted in hours.

Some of the primary cells were discharged 5 days after manufacture, these cells being kept at 25° C. Another batch was kept for 30 days at 70° C. before being discharged. No difference between the curves of these cells was observed. There was no delay in voltage rise in any case.

Tests carried out with the aluminum chloride replaced by antimony pentachloride molecule by molecule gave analogous results.

The addition of the co-solvents phosphoryl chloride or sulfuryl chloride to the electrolyte did not change its properties as to the suppression of the delay effect.

I claim:

1. An electrolyte for an electric cell whose negative active material is constituted by lithium and whose positive active material is constituted by thionyl chloride, the electrolyte containing at least one solvent and at least one solute, said solvent being thionyl chloride and said solute being chosen from the group which consists of lithium tetrachloroaluminate and lithium hexachloroantimonate, wherein said electrolyte further includes a complex chosen from the group which consists of $AlCl_3,SO_2$ and $SbCl_5,SO_2$.

2. An electrolyte according to claim 1, wherein the proportions of solute are as follows: for 3 moles of $AlCl_3$ or of $SbCl_5$ in all, 2 moles of LiCl and 1 mole of $SO_2$.

3. An electrolyte according to claim 1 or 2, wherein a co-solvent is added, said co-solvent being chosen from the group which consists of sulfuryl chloride and phosphoryl chloride.

4. A method of preparing electrolyte according to claim 1, wherein firstly a Lewis acid chosen from the group which consists of aluminum chloride and antimony pentachloride, secondly lithium chloride and lastly sulphur dioxide are added to the thionyl chloride in quantities which correspond to the contents required in the electrolyte, the molar proportions being such that there is an excess of said Lewis acid relative to the lithium chloride by a molar quantity equal to that of the sulphur dioxide.

5. A method of preparing electrolyte according to claim 1, wherein lithium carbonate and a Lewis acid chosen from the group which includes aluminum chloride and antimony pentachloride are added to the thionyl chloride in proportions such that there are 3 moles of said Lewis acid per mole of lithium carbonate, the quantity of said Lewis acid corresponding to the contents required in the electrolyte.

6. A method of preparing electrolyte according to claim 1, wherein lithium and a Lewis acid chosen from the group which consists of aluminum chloride and antimony pentachloride are added to the thionyl chloride in equimolar proportions, the quantity of said Lewis acid corresponding to the contents required in the electrolyte.

7. An electric cell whose negative active material is constituted by lithium, the positive active material being constituted by thionyl chloride which includes an electrolyte according to any one of claims 1 or 3.

8. An electric cell whose negative active material is constituted by lithium, the positive active material being constituted by thionyl chloride which includes an electrolyte produced according to any one of claims 4 to 6.

* * * * *

UNITED STATES PATENT AND TRADEMARK OFFICE
CERTIFICATE OF CORRECTION

PATENT NO. : 4,375,502
DATED : 1 March 1983
INVENTOR(S) : Jean-Paul Gabano

It is certified that error appears in the above—identified patent and that said Letters Patent is hereby corrected as shown below:

Column 4, line 46: delete "includes" and insert

--consists of--.

Column 4, line 62: change "or" to --to--.

Signed and Sealed this

Tenth Day of May 1983

[SEAL]

Attest:

GERALD J. MOSSINGHOFF

Attesting Officer　　Commissioner of Patents and Trademarks